(12) United States Patent
Cierniak

(10) Patent No.: US 9,075,862 B1
(45) Date of Patent: *Jul. 7, 2015

(54) RANKING USER CONTENT BY CONTENT ATTRIBUTES

(71) Applicant: Google Inc., Mountain View, CA (US)

(72) Inventor: Michal Cierniak, Palo Alto, CA (US)

(73) Assignee: Google Inc., Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/268,851

(22) Filed: May 2, 2014

Related U.S. Application Data

(63) Continuation of application No. 12/270,676, filed on Nov. 13, 2008, now Pat. No. 8,756,240.

(51) Int. Cl.
 *G06F 17/30* (2006.01)
(52) U.S. Cl.
 CPC .................. *G06F 17/30595* (2013.01)
(58) Field of Classification Search
 None
 See application file for complete search history.

(56) References Cited

U.S. PATENT DOCUMENTS

| | | | |
|---|---|---|---|
| 7,822,631 B1 * | 10/2010 | Vander Mey et al. | 705/7.29 |
| 8,195,522 B1 | 6/2012 | Sonne | |
| 8,554,601 B1 * | 10/2013 | Marsh et al. | 705/7.32 |
| 2007/0168946 A1 | 7/2007 | Drissi | |
| 2008/0120166 A1 | 5/2008 | Fernandez | |
| 2009/0112974 A1 | 4/2009 | Ravikumar | |
| 2010/0042577 A1 | 2/2010 | Rinearson | |

* cited by examiner

*Primary Examiner* — Anh Tai Tran
(74) *Attorney, Agent, or Firm* — Fish & Richardson P.C.

(57) ABSTRACT

System, methods, and apparatus for attribute-based rating of authors and content. In some methods, first content authored by a first author having an attribute that is common to other authors is received. A second author having the attribute is identified as well as content authored by the second author. A user feedback base rating that is assigned to the second author is identified. An initial rating for the first content is generated based on the user feedback based rating that is assigned to the second author, and the initial rating is assigned to the first content.

15 Claims, 4 Drawing Sheets

RANKING USER CONTENT BY CONTENT ATTRIBUTES

CROSS-REFERENCE TO RELATED APPLICATIONS

This application is a continuation application of, and claims priority to, U.S. patent application Ser. No. 12/270,676, entitled Attribute-Based Rating of Authors and Content, filed on Nov. 13, 2008. The disclosure of the foregoing application is incorporated herein by reference in its entirety for all purposes.

TECHNICAL FIELD

This specification relates to rating authors and content authored by the authors.

BACKGROUND

Users can view content authored by other users and displayed on web pages of websites. For example, users can author content about a subject, e.g., a product review or an article on politics or technology, and upload the content to a website's server. The publishers of the website can receive and display the content on a web page of the website. Many publishers allow other users, such as viewers and/or editors, to provide user feedback to rate the content displayed on the web page. Some publishers use a rating determination system to generate a content rating for the content displayed on one or more web pages of their websites and/or an author rating of the authors of the rated content. The publishers use the user feedback based rating to decide whether to display the content on their websites and/or as a general indicator of the quality of the content or the author.

When content is first authored, however, there are no user feedback based ratings for rating the content. In some systems, an initial content rating of the new content can be based on an existing author rating of the author. However, if the author does not have an existing author rating, the publishers are not able to make such a rating inference.

SUMMARY

This specification describes technologies relating to attribute-based rating of content and of authors of the content. Content authored by an author is received for displaying at an Internet location where it can be viewed by users. Prior to receiving ratings from the users, an initial content rating is assigned to the content. The initial content rating is based on the author's attributes and user feedback based ratings assigned to other authors having the same or similar attributes. The ratings assigned to the other authors can include content ratings of content authored by those authors, author ratings of the authors, or both. Subsequently, as ratings feedback for the content from users is received, the initial content rating is eliminated or phased out and replaced by the user feedback based content rating to reflect the feedback. An initial author rating for the author can be generated in a similar manner. An initial content rating, initial author rating or both can be used by a publisher to decide whether to display the content on a website and can also be used as a general indicator of the quality of the content or the author.

In general, one aspect of the subject matter described in this specification can be embodied in methods that include the actions of receiving first content authored by a first author, the first author having an attribute that is common to other authors; determining that the first author does not have an assigned user feedback based rating and in response to such determination: identifying second authors having the attribute and assigned user feedback based ratings; generating an initial rating for the first author based on the user feedback based ratings that are assigned to the second authors; and assigning the initial rating to the first author. The initial rating can be an initial content rating of the content, or can be an initial author rating of the author. Other embodiments of this aspect include corresponding systems, apparatus, and computer program products.

Another aspect of the subject matter described in this specification can be embodied in methods that include the actions of receiving at a content management system first content authored by a first author; determining at the content management system that the first author has no assigned rating; and in response to determining that the first author has no assigned rating: identifying at the content management system an attribute of the first author; determining at the content management system a rating for the identified attribute based on ratings that are assigned to other authors having the attribute, the ratings that are assigned to other authors based on user feedback; generating at the content management system an initial content rating for the first content based on the rating for the identified attribute; and assigning at the content management system the initial content rating to the first content. Other embodiments of this aspect include corresponding systems, apparatus, and computer program products.

Particular implementations of the subject matter described in this specification can be implemented to realize one or more of the following advantages. Assigning an initial rating for new authors and new content authored by the new authors allows quality-based decisions to be made regarding the new authors and new content. For example, new content that has a high initial content rating can be prominently displayed to other users.

The initial ratings based on author's attributes provide a useful estimate of an actual rating. An overall rating for content authored by authors belonging to a group, or an overall rating for authors belonging to the group, can each be used as an indication of the general quality of authors belonging to the group, or the general quality of content authored by those authors. Assigning initial ratings that are derived from these overall ratings provides more useful information than assigning an "unrated" or "neutral" initial rating.

The details of one or more implementations of the specification are set forth in the accompanying drawings and the description below. Other features, aspects, and advantages of the specification will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
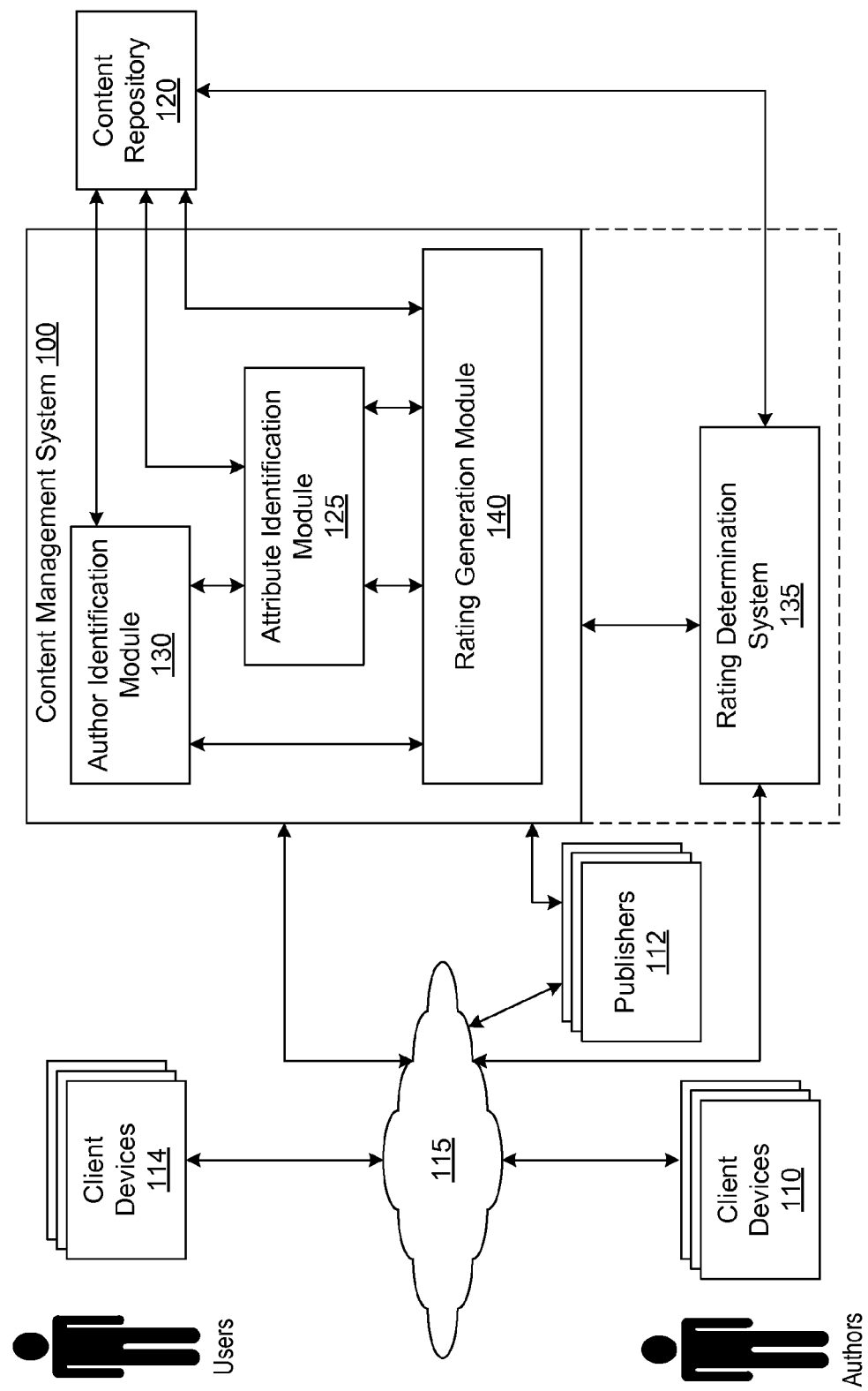
FIG. 1 is a block diagram of an example content management system for assigning ratings.

FIG. 1 is a block diagram of an example content management system 100 for assigning ratings. Authors operating their client devices 110, e.g., computer systems, can transmit content for display in multiple web pages on multiple websites on the Internet. Content received from an author is presented, for example, on web pages on websites hosted by publishers 112. Example publishers 112 include blog publishers, discussion board publishers, video publishers, and product review publishers. Other users on the network can view the content by use of their client devices 114, and can provide feedback responsive to the content, such as ratings feedback. Example feedback can include a "thumbs up" or "thumbs down" rating, a Likert scale rating, or identifying the content or the author as belonging to a "favorite" category. Such feedback can be used to assign ratings to the content and to the authors providing the content. Once determined, the ratings can then be provided to the publishers 112 who can use the ratings to make decisions regarding the content, e.g., whether or not to display the content on the publishers' websites.

When an author provides new content to a website, the content has not been rated by other users. Furthermore, when a new author, i.e., an author who has not previously authored any content provided to the website, provides content to the website, the author does not have any associated content that is rated. Thus, new authors submitting new content do not have any associated ratings, i.e., an author rating or content rating, from which an initial rating of the content can be determined.

Accordingly, the content management system 100 is configured to generate an initial content rating and assign the initial content rating to new content received from an author presenting new content for a first time. An initial author rating can also be generated for the new author as well. These initial ratings are based on the ratings (content ratings and/or author ratings) assigned to other authors that have one or more attributes in common with the new author.

An attribute is quality, characteristic, or property that is used to describe or identify an author. Example attributes include an author's e-mail address; identification information specified by the author, e.g., name; or other demographic information specified by the author specifying a demographic classification, e.g., age, profession, location; group memberships.

Attributes that are associated with an author are also associated with the content authored by the author. For example, an author identifier can be used to associate attributes with the author and to associate content authored by the author with the author. These associations are used to associate the content authored by the author with the author's attributes.

The assigned ratings of the other authors that are used to determine initial ratings for an author can be user feedback based author ratings of the other authors, user feedback based content ratings of content authored by the other authors, or both. Such ratings can be determined by a rating determination system 135, described below. The rating determination system 135 can be a system that is separate from the content management system 100, or, alternatively, can be a system that is integrated with the content management system 100, as indicated by the dashed extension of the content management system 100 boundary.

In some implementations, the content management system 100 can communicate with a content repository 120, e.g., a computer-readable medium or a file server, in which content received from an author can be stored. Received content can be in many forms including text, audio, video, images, and combinations of them. Author data, including author attribute data, author ratings and content ratings for authors, can also be stored in the content repository 120. The author data can alternatively be stored in other data stores.

In some implementations, the content repository 120 can be at a location that is remote from the content management system 100. For example, the content repository 120 can be hosted on one or more data servers at the sites of publishers 112 on which content is stored, and the content management system 100 can be hosted on a different server that receives data from the publisher 112.

In other implementations, the content repository 120 can be hosted with the content management system 100. For example, a particular publisher 112 hosting the content repository 120 for its site can also implement the content management system 100 to provide initial ratings of user-contributed content.

Various software architectures can be used to implement the content management system 100. One example implementation includes an attribute identification module 125, an author identification module 130, and a rating generation module 140. Other architectures and implementations can also be used.

The attribute identification module 125 is configured to identify attributes of authors from whom content is received. In some implementations, the attribute identification module 125 obtains an author's attributes from attribute data such as the author's e-mail address, identification information specified by the author, e.g., name, and other demographic information specified by the author, e.g., age, profession, location. This attribute data can be stored as account information of the author and accessed by the attribute identification module 125, or can be required to be input by the author for receipt by the attribute identification module 125 when the author provides content.

For example, to provide content, the author may be required to log into a website on which the author has previously created a user account and provided personal information that represents the author's attributes, which is maintained by the content management system 100. Such information can include age, profession, and user groups to which the author belongs, to name just a few. When the author's content is submitted, information about the author that is included in the author's user account is provided to the attribute identification module 125.

Alternatively, in the absence of a user account, the author may be required to provide some identifying information when providing the content. The personal information can be an e-mail address and other information that can be used to identify attributes of the author, such as age, profession, and the like.

The attribute identification module 125 associates the content with the attributes of the author of the content. For example, the content management system 100 can associate attributes of the author as metadata with the content provided by the author.

If a first author provides content for a first time, then both the content and the first author are new. The rating generation module 140 determines if either of the first author or the content of the first author are new, i.e., have no author rating or content rating of the new content, respectively, assigned to the first author. If the rating generation module 140 determines that no such ratings are assigned, then an initial rating will be generated based on the user feedback based author ratings of other, previously-rated authors sharing one or more attributes with the first author, the user feedback based content ratings of content authored by those other authors, or both.

To assign an initial rating to the new content and to the first author, attributes that the first author shares with other previously-rated authors can be determined to identify ratings from which an initial rating for the new author or content can be determined. Thus, the author identification module 130 identifies other authors and corresponding content authored by those authors. The other authors that are identified are authors that have previously provided content and have assigned ratings based on user feedback.

The author identification module 130 identifies the other authors that have attributes in common with the first author by comparing the attributes of the first author to attributes of other authors and identifying matching attributes. For example, the author identification module 130 can identify that content from the first author is sent from the e-mail address author1@cs.stanford.edu. The domain portion of the e-mail attribute data can be associated with the categories of "Computer Science" and "Stanford University." The association can be specified by a system administrator, or can, for example, be identified by using the attribute identification module 130 to crawl the domain "www.cs.standford.edu" and identify category topics using clustering techniques, such as k-means clustering.

The author identification module 130, in turn, can identify a second author with matching attributes. Such a second author can have previously sent content to the content management system 100 from the e-mail address author2@cs.stanford.edu, or otherwise be associated with the attributes of "Computer Science" and "Stanford University."

Assuming the second author has an assigned rating based on user feedback, i.e., an author rating or content ratings for the second author's content based on user feedback have been determined, the determined rating or ratings can be used to generate an initial rating for the new content or the first author or both.

In some implementations, the content management system 100 is in communication with the rating determination system 135 that is configured to assign ratings to content based on user feedback, to the authors of the content, or both. In other implementations, the rating determination system 135 is a component of the content management system. From the rating determination system 135, the content management system 100 can receive the ratings assigned to the second author, i.e., content ratings of the second author's content and, if generated by the rating determination system 135, an author rating of the author.

The rating determination system 135 can determine the content ratings and author ratings in a variety of different ways. Typically, users view the content and provide user feedback. Feedback can be explicit and include, for example, a "thumbs up" or "thumbs down" rating, a Likert scale rating, or identifying the content or the author as belonging to a "favorite" category. The rating determination system 135 can assign ratings for an author based on the ratings of content authored by the author, or can allow users to optionally rate authors independent of content authored by the authors. Other rating algorithms can also be used.

In some implementations, the content management system 100 can access the user feedback based ratings directly if the ratings are stored in the content repository 120.

The rating generation module 140 generates and assigns an initial content rating to the new content received from the first author based on the author ratings or content ratings or both of the second author generated by the rating determination system 135. In addition to assigning an initial content rating to the new content, the rating generation module 140 can also determine and assign an initial author rating to the first author if the first author is a new author providing content for the first time. In some implementations, the initial content rating and the initial author rating can be the same rating. In some implementations, the initial content rating for new content received from an existing author can be a function of both the author rating for the existing author and ratings of authors similar to the existing author.

In some implementations, the initial ratings can be based, in part, on a scale factor applied to the user feedback based ratings. For example, if the first author and the second author have a common attribute, the new content of the first author can be assigned a rating equal to the average rating of all content authored by the second author, or fraction of that average, e.g., 70% of a numerical rating associated with the second author.

In some implementations, the initial ratings can be proportional to the number and type of common attributes. For example, the feedback based rating of a second author with the e-mail address ending in cs.stanford.edu will affect the rating of new authors with the e-mail address ending in "@cs.stanford.edu" more strongly than new authors with the e-mail address ending in "@stanford.edu" or "cs.ucla.edu." For example, if the new author has an e-mail address ending in "@stanford.edu" the new content of the new author can be assigned a rating equal to a smaller fraction of the average rating of all content authored by the second author, e.g., 50% of a numerical rating associated with the second author if no ratings are available for established authors having an e-mail address ending in "@stanford.edu."

In some implementations, the initial rating for the new content can be a function of a rating related to an attribute. For example, an average rating for all authors having an e-mail address "@cs.stanford.edu" can be determined and associated with the attribute of having an e-mail address ending in "@cs.stanford.edu." This attribute-based rating can used to rate a new author with the same or similar attribute.

Although the example above has been described in the context of an attribute defined by e-mail addresses, many other attributes can be used, either alone or in combination, to generate initial author and content ratings. For example, a new author may belong to a first user group (a first attribute A1), and may have a doctorate in a certain discipline (a second attribute A2), and may reside in a certain state (a third attribute A3). An initial author rating may be based on a central tendency of the ratings of authors having the attributes of A1 or A2 or A3, as expressed in equation (1) below:

$$\text{Initial Author Rating} = WA1 \times RA1 + WA2 \times RA2 + WA3 \times RA3 \quad (1)$$

where RA1, RA2 and RA3 are the average author ratings of authors that have the first, second and third attributes, respectively, and WA1, WA2 and WA3 are weights selected to ensure that the initial rating does not exceed a maximum rating (or a percentage of the maximum rating, e.g., 70%). The weights also reflect an importance of each attribute in ranking a new author. For example, the attribute of belonging to the first user group may be more important than that attribute of residing in the same state, in which case the weight WA1 would be more than WA3.

A similar rating calculation can also be used for an initial rating of content:

$$\text{Initial Content Rating} = WA1 \times CA1 + WA2 \times CA2 + WA3 \times CA3 \quad (2)$$

where CA1, CA2 and CA3 are the average content ratings of content authored by authors that have the first, second and third attributes, respectively, and WA1, WA2 and WA3 are weights selected to give the attributes appropriate relative importance and to ensure that the initial rating does not exceed a maximum rating (or a percentage of the maximum rating, e.g., 70%).

In some implementations, the weights associated with each attribute rating are determined by machine learning techniques. For example, initial ratings of authors or content can be compared to later ratings based on user feedback, and linear regression can be used to determine weights that would have resulted in an initial rating estimate that more closely approximates the later ratings. In such implementations, the learned weights are used for future initial ratings for new authors.

Other algorithms can also be used to generate an initial rating based on historical data of the ratings of other authors or content. For example, in other implementations, initial author ratings and content ratings are based on the ratings of a combination of author ratings of authors having the same or similar attributes and the content ratings of content authored by those authors. For example, another formula for computing the initial author rating to assign to the author is:

$$\text{Initial Author Rating} = WA11 \times RA1 + WA12 \times RA2 + \ldots \\ WA1N \times RA1N + WA21 \times CA1 + WA22 \times CA2 + \ldots \\ WA2N \times RA2N \quad (3)$$

where $WA11 \ldots WA1N$ and $WA21 \ldots WA2N$ are weights selected to ensure that the initial rating does not exceed a maximum rating (or a percentage of the maximum rating, e.g., %70).

Similarly, another formula for computing the initial content rating to assign to the author is:

$$\text{Initial Content Rating} = WA31 \times RA1 + WA32 \times RA2 + \ldots \\ WA3N \times RA3N + WA41 \times CA1 + W42 \times CA2 + \ldots \\ WA4N \times RA4N \quad (4)$$

where $WA31 \ldots WA4N$ and $WA41 \ldots WA4N$ are weights selected to ensure that the initial rating does not exceed a maximum rating (or a percentage of the maximum rating, e.g., 70%).

Other formulas for determining initial author ratings and content ratings from actual author ratings and content ratings can also be used.

In some implementations, the initial ratings can be maintained until other users rate the new author or the content authored by the new author. In some implementations, the initial ratings are eliminated when one rating by a user is provided. In other implementations, the initial ratings are maintained until a threshold number of ratings are received, e.g., five or more ratings, and an average rating can be generated.

In some implementations, the initial ratings can be combined with ratings feedback received from users to determine the ratings for the content. For example, the system 100 determines a rating for content that is proportional to a combination of the initial content rating multiplied by a first weight and the user feedback based ratings multiplied by a second weight. The first and second weights can define a percentage of the initial content rating and a percentage of the user feedback based ratings, respectively. The first weight associated with the initial content rating can be progressively decreased as additional user feedback related to the content is received, and the second weight, in turn, can be progressively increased. Adjusting the weights according to this process results in smoother transitions from an initial content rating to a rating based on user feedback based ratings.

Figure 2:
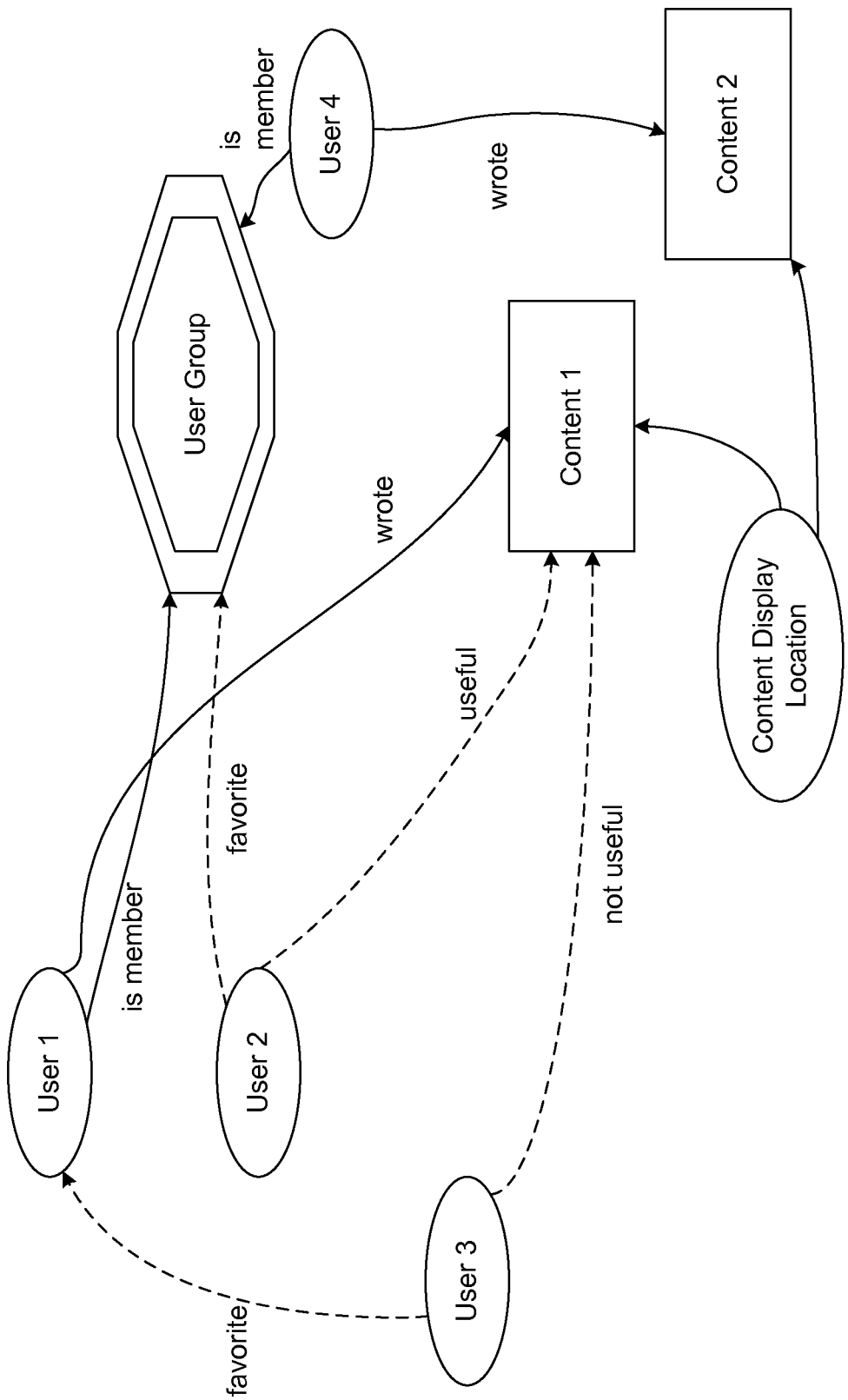
FIG. 2 is an entity relationship diagram illustrating dependencies in an example rating system.

FIG. 2 is an entity relationship diagram illustrating example dependencies in an example rating system. The dependencies illustrated by solid lines are affiliations defined by common attributes, and the dependencies illustrated by dashed lines are affiliations associated with user-contributed feedback. In the example graph of FIG. 2, Users 1 and 4 are members of a User Group, e.g., the Computer Science Department of Stanford University. Multiple users can join a group, e.g., by requesting a group administrator to accept a membership. The group administrator can maintain a list of members of a group. Two members can be determined as belonging to a same group if information about the members, e.g., members' names, is found on the same list maintained by the group administrator. User 2 has identified the User Group as being a favorite of the User 2. User 3 has identified User 1 as being a favorite of User 3. User 1 has authored Content 1 that is displayed at a content display location accessible to all users, e.g., a web blog. While User 2 has rated the content as being useful, User 3 has rated the same content as being not useful.

Based on this feedback received from User 2 and User 3, respective ratings have been assigned to User 1 and Content 1 authored by User 1.

User 4 is a new author that has provided new content to be displayed at the content display location. To determine an initial rating for user 4, the content management system 100 identifies User 1 as having the same attribute of belonging to the user group, and accesses the ratings of User 1 and Content 1. The ratings associated with User 1 and Content 1 are used to generate the initial ratings for User 4 and the Content 2. The initial ratings can be generated using the example rating formulas (1)-(4) above, or by using some other formulas.

These initial ratings are maintained until other users rate the content authored by User 4, or rate User 4, or otherwise provide some feedback by which a rating for User 4, the content authored by User 4, or both can be generated.

Figure 3:
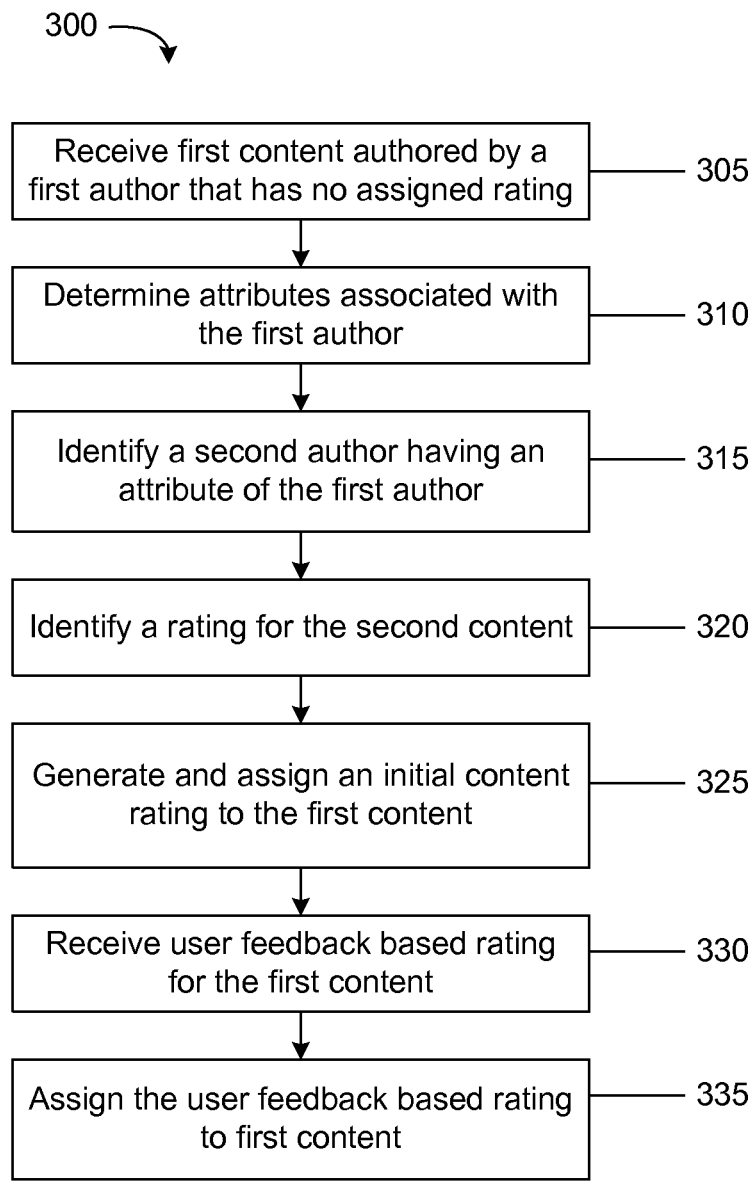
FIG. 3 is a flow chart of an example process for assigning initial ratings.

FIG. 3 is a flow chart of an example process 300 for assigning ratings. The example process 300 assigns ratings to new content authored by an unrated author based on the ratings of content authored by other authors. The process 300 can be implemented in the system 100 shown in FIG. 1.

The process 300 receives first content authored by a first author that has no assigned rating (305). For example, the content management system 100 receives content from an author transmitting the content through a client device 110, e.g., a computer system in communication with the content management system 100 through one or more networks, e.g., the Internet. Alternatively, the author can transmit the content to the publisher 112 who can subsequently transmit the content and the author's attributes to the content management system 100 if the content management system 100 is implemented separate from the publisher 112. The author does not have an assigned rating, i.e., the author does not have an author rating based on user feedback, nor does the content authored by the author have a content rating based on user feedback.

The process 300 determines attributes associated with the first author (310). For example, the attribute identification module 125 determines attributes associated with the first author based on information, e.g., attribute data that are provided with the received content or accessed by use of an account of the first author.

The process 300 identifies a second author having an attribute of the first author (315). For example, the author identification module 130 identifies a second author sharing a common attribute with the first author.

The process 300 identifies a rating for the second content (320). For example, the rating generation module 140 can receive the rating for the second content from the rating determination system 135.

The process 300 generates and assigns an initial content rating to the first content (325). For example, the rating generation module 140 can generate an initial content rating for the first content based on the rating for the second content as well as attributes that the second author shares in common with the first author. In some implementations, the rating generation module 140 assigns a rating identical to the rating of the second content as the initial rating for the first content. In other implementations, the rating generation module 140 assigns weights to the attributes that the first and second author share in common, and determines the initial rating based, in part, on these weights.

The process 300 receives a user feedback based rating for the first content (330). The user feedback based rating can be based different types of user feedback, such as the specified usefulness of the first content and reviews from other users who view the first content.

The process 300 assigns the user feedback based rating to the first content (335). For example, upon receiving the user feedback based rating for the first content from the ratings determination system 135, the content management system 100 replaces the initial rating with the user feedback based rating.

In some implementations, the process 300 uses the content ratings authored by the second author (and other authors) to assign an initial author rating for the first author. Alternatively or additionally, the process 300 can use the second author rating (and the author ratings of other authors) to assign an initial author rating for the first author and/or the initial content rating to content authored by the first author. Other combinations of rating the first author and the content authored by the first author based on the ratings of second authors and content authored by the second author can also be used, e.g., those described with reference to equations (1)-(4) above.

Figure 4:
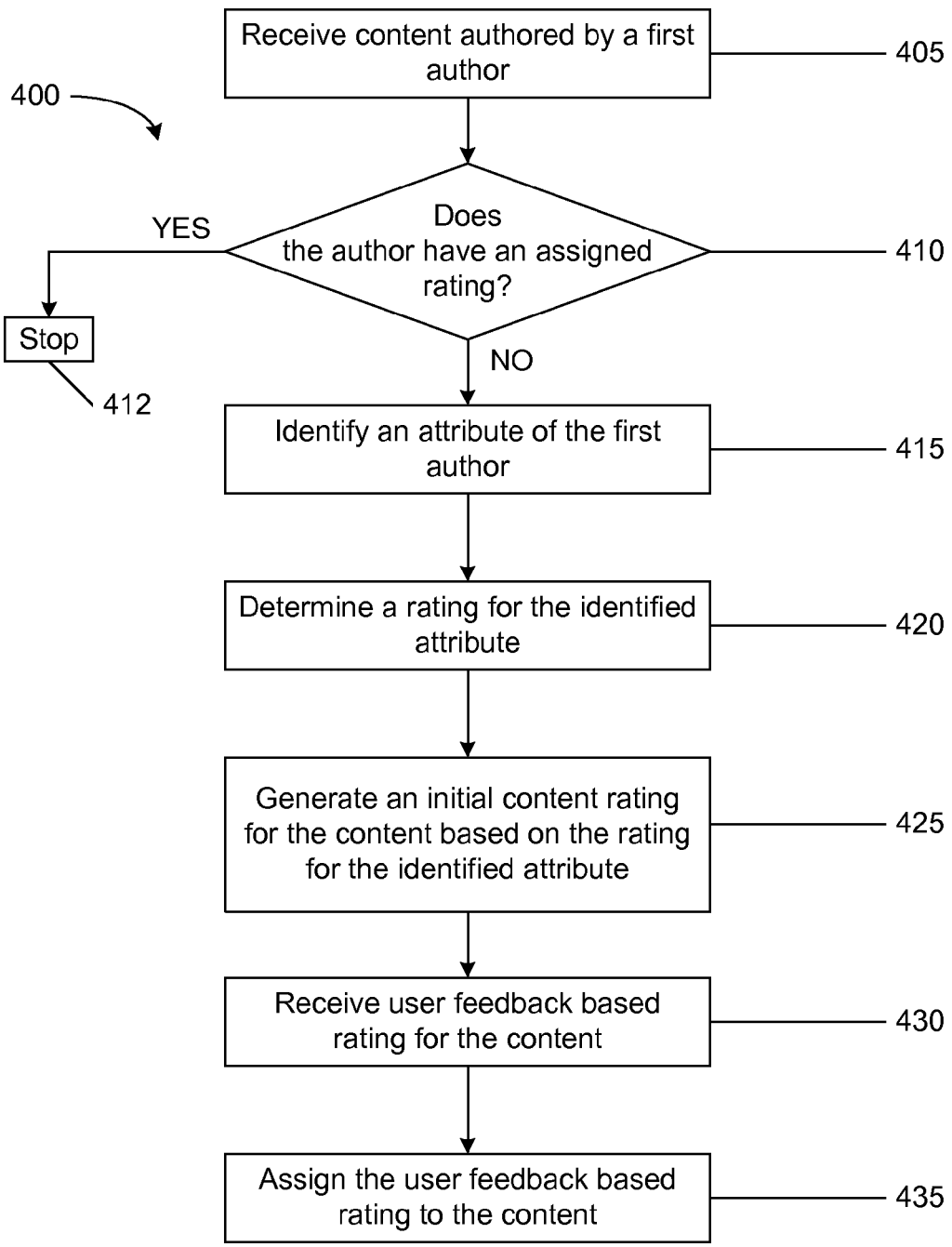
FIG. 4 is a flow chart of another example process for assigning initial ratings.

FIG. 4 is a flow chart of an example process 400 for assigning initial ratings. The process 400 assigns ratings to new content authored by an unrated author based on ratings associated with attributes that the author of the new content shares with other authors. The process 400 can be implemented in the content management system 100 of FIG. 4.

The process 400 receives content authored by a first author (405). For example, the content management system 100 receives content from an author transmitting the content through a client device 110.

The process 400 determines if the first author has an assigned rating (410). For example, the content management system 100 can be in communication with the system for rating authors. The content management system 100 can provide information identifying the author to the system, and receive an author rating for the author or a content rating for content authored by the author, if available. If no assigned ratings are available, then the author has no assigned rating.

If process 400 determines that the first author has an associated author rating, an initial rating based on ratings of other authors or content authored by other authors need not be generated, and the process 400 ends (412). For example, the content can be assigned an initial rating based on the first author's current author rating.

Otherwise, the process 400 identifies an attribute of the first author (415). For example, the attribute identification module 125 identifies an attribute of the first author.

The process 400 determines a rating for the identified attribute (420). For example, the author identification module 130 identifies other authors that share the same attribute. Based on the author ratings of all authors that share the same attribute, the content management system 100 determines a rating for the group defined by the identified attribute. Alternatively, the content management system 100 can receive a rating from a system that is configured to determine a rating for a group based on ratings of authors in the group.

The process 400 generates an initial content rating for the content based on the rating for the identified attribute (425). For example, the attribute generation module 145 generates the initial rating for the content received from the first author based on the identified rating for the group to which the first author belongs. The initial rating, in some implementations, is equal to the rating of the identified attribute multiplied by a weight, such as 70%.

The process 400 receives a user feedback based rating for the content (430). The user feedback based rating can be based different types of user feedback, such as the specified usefulness of the first content and reviews from other users who view the first content.

The process 400 assigns the user feedback based rating to the first content (435). For example, upon receiving the user feedback based rating for the first content from the ratings determination system 135, the content management system 100 replaces the initial rating with the user feedback based rating.

In some implementations, the process 400 uses the rating of the identified attribute to assign an initial author rating for the first author. Alternatively or additionally, the process 400 can use ratings for other attributes of the author to generate an initial rating for the content or the author, such as described with reference to equation 1.

Implementations of the subject matter and the functional operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a random or serial access memory device, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other module suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the specification or of what may be claimed, but rather as descriptions of features specific to particular implementations of the specification. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

What is claimed is:

1. A computer-implemented method, comprising:
    receiving, at a data processing apparatus, first content authored by a first author;
    determining, by the data processing apparatus, that the first author has no assigned rating; and
    in response to determining that the first author has no assigned rating:
       identifying attributes of the first author;
       identifying other authors that are not authors of the first content, each other author having one or more attributes in common one or more identified attributes of the first author and not an author of the first content, and wherein at least one of the other authors has at least one attribute not in common with the first author;
       for each identified attribute of the first author in common with an attribute of one or more other authors, generating a rating for the identified attribute based on ratings that are assigned to the other authors having the attribute, the ratings that are assigned to other authors being based on user feedback;
       generating an initial content rating for the first content based on the ratings for the identified attributes; and
       assigning the initial content rating to the first content.

2. The computer-implemented method of claim 1, further comprising eliminating the initial content rating after receiving a user feedback based content rating for the first content.

3. The computer-implemented method of claim 1, further comprising:
    receiving user feedback based ratings for the first content; and
    generating a content rating for the first content that is proportional to a combination of the assigned initial content rating and the received user feedback based ratings.

4. The computer-implemented method of claim 1, wherein one of the attributes is a domain portion of an e-mail address.

5. The method of claim 1, wherein one of the attributes is a membership of the first author and the second author in a same group, the group being defined by a membership list of authors that are members of the group.

6. A system, comprising:
    one or more computers; and
    computer readable media coupled to the one or more computers and storing software instructions configured to cause the one or more computers to perform operations comprising:
       receiving first content authored by a first author;
       determining that the first author has no assigned rating; and
       in response to determining that the first author has no assigned rating:

identifying attributes of the first author;

identifying other authors that are not authors of the first content, each other author having one or more attributes in common one or more identified attributes of the first author and not an author of the first content, and wherein at least one of the other authors has at least one attribute not in common with the first author;

for each identified attribute of the first author in common with an attribute of one or more other authors, generating a rating for the identified attribute based on ratings that are assigned to the other authors having the attribute, the ratings that are assigned to other authors being based on user feedback;

generating an initial content rating for the first content based on the ratings for the identified attributes; and assigning the initial content rating to the first content.

7. The system of claim 6, the operations further comprising eliminating the initial content rating after receiving a user feedback based content rating for the first content.

8. The system of claim 6, the operations further comprising:

receiving user feedback based ratings for the first content; and generating a content rating for the first content that is proportional to a combination of the assigned initial content rating and the received user feedback based ratings.

9. The system of claim 6, wherein one of the attributes is a domain portion of an e-mail address.

10. The system of claim 6, wherein one of the attributes is a membership of the first author and the second author in a same group, the group being defined by a membership list of authors that are members of the group.

11. A non-transitory computer readable medium storing instructions configured to cause one or more computers to perform operations comprising:

receiving first content authored by a first author;

determining that the first author has no assigned rating; and in response to determining that the first author has no assigned rating:

identifying attributes of the first author;

identifying other authors that are not authors of the first content, each other author having one or more attributes in common one or more identified attributes of the first author and not an author of the first content, and wherein at least one of the other authors has at least one attribute not in common with the first author;

for each identified attribute of the first author in common with an attribute of one or more other authors, generating a rating for the identified attribute based on ratings that are assigned to the other authors having the attribute, the ratings that are assigned to other authors being based on user feedback;

generating an initial content rating for the first content based on the ratings for the identified attributes; and assigning the initial content rating to the first content.

12. The non-transitory computer readable medium of claim 11, the operations further comprising eliminating the initial content rating after receiving a user feedback based content rating for the first content.

13. The non-transitory computer readable medium of claim 11, the operations further comprising:

receiving user feedback based ratings for the first content; and generating a content rating for the first content that is proportional to a combination of the assigned initial content rating and the received user feedback based ratings.

14. The non-transitory computer readable medium of claim 11, wherein one of the attributes is a domain portion of an e-mail address.

15. The non-transitory computer readable medium of claim 11, wherein one of the attributes is a membership of the first author and the second author in a same group, the group being defined by a membership list of authors that are members of the group.

\* \* \* \* \*